(12) United States Patent  
Cominetti

(10) Patent No.: US 8,265,814 B2  
(45) Date of Patent: Sep. 11, 2012

(54) CONTROL METHOD AND UNIT OF AN ELECTRIC TRACTION MOTORCYCLE ACCORDING TO THE POSITION OF AN ACCELERATOR GRIP

(75) Inventor: Paolo Cominetti, Bologna (IT)

(73) Assignee: Magneti Marelli S.p.A., Corbetta (IT)

( * ) Notice: Subject to any disclaimer, the term of this patent is extended or adjusted under 35 U.S.C. 154(b) by 475 days.

(21) Appl. No.: 12/461,358

(22) Filed: Aug. 10, 2009

(65) Prior Publication Data  
US 2010/0042280 A1 Feb. 18, 2010

(30) Foreign Application Priority Data  
Aug. 8, 2008 (EP) ..................................... 08425561

(51) Int. Cl.  
*B60L 9/00* (2006.01)  
*G05D 1/00* (2006.01)  
*G06F 7/00* (2006.01)

(52) U.S. Cl. .............................................. 701/22; 701/1

(58) Field of Classification Search .................... None  
See application file for complete search history.

(56) References Cited

U.S. PATENT DOCUMENTS

| | | | | |
|---|---|---|---|---|
| 4,607,733 A * | 8/1986 | Dodge | ........................... | 477/194 |
| 4,681,198 A * | 7/1987 | Costa Mas | ...................... | 192/35 |
| 5,552,988 A | 9/1996 | Kawaguchi | | |
| 6,371,890 B1 * | 4/2002 | Schell | ........................... | 477/209 |
| 6,377,016 B1 * | 4/2002 | Strong | ........................... | 318/653 |
| 6,637,530 B1 * | 10/2003 | Endo et al. | ................. | 180/65.25 |
| 7,793,751 B2 * | 9/2010 | Stevens | ........................... | 180/336 |
| 2003/0169002 A1 | 9/2003 | Hughes | | |
| 2006/0289208 A1 * | 12/2006 | Katsuhiro et al. | ........... | 180/65.2 |

FOREIGN PATENT DOCUMENTS

EP 1 950 130 7/2008  
JP 2003 127959 5/2003

OTHER PUBLICATIONS

European Search Report mailed Nov. 6, 2008 in European Appln. No. 08425561.1-2425.

* cited by examiner

*Primary Examiner* — Khoi Tran  
*Assistant Examiner* — Bhavesh V Amin  
(74) *Attorney, Agent, or Firm* — Davidson Berquist Jackson & Gowdey, LLP

(57) ABSTRACT

A control method and unit of an electric traction motorcycle; there are provided: an accelerator grip pivotally mounted to rotate in a first rotation direction and about a rotation axis from a neutral position towards a maximum acceleration position; an elastic member which tends to keep the accelerator grip in the neutral position; at least one position sensor for detecting the angular position of the accelerator grip about the rotation axis; and a control device which drives an electric machine of the motorcycle according to the angular position of the accelerator grip; the accelerator grip is mounted to rotate in a second rotation direction opposite to the first rotation direction and about the rotation axis from the neutral position towards a deceleration position which is arranged in the direction opposite to the maximum acceleration position with respect to the neutral position.

8 Claims, 2 Drawing Sheets

CONTROL METHOD AND UNIT OF AN ELECTRIC TRACTION MOTORCYCLE ACCORDING TO THE POSITION OF AN ACCELERATOR GRIP

TECHNICAL FIELD

The present invention relates to a control method and unit of an electric traction motorcycle according to the position of an accelerator grip.

The present invention is advantageously applied to a motorcycle, to which explicit reference will be made in the following description without hence loosing in generality.

BACKGROUND ART

A motorcycle of the currently marketed type normally comprises an accelerator grip (conventionally the grip on the right of the handlebar), which is pivotally mounted and mechanically connected to a control of the engine which adjusts the generation of driving torque. Normally, the accelerator grip is connected to the engine control via at least one Bowden type wire, which is inserted into an external sheath, in order to slide with respect to the sheath itself and is biased by a return spring towards a rest position which corresponds to a zero driving torque and is defined by a mechanical stroke end. In other words, the accelerator grip may rotate from the rest position, corresponding to a zero driving torque and defined by a first mechanical stroke end, to a maximum opening position, corresponding to a maximum driving torque and defined by a second mechanical stroke end; the return spring biases the accelerator grip towards the rest position, and therefore the driver must apply a twisting torque onto the accelerator grip to displace the accelerator grip itself from the rest position.

In a motorcycle of the currently marketed type provided with an internal combustion thermal engine, when the accelerator grip is in the rest position and the number of revolutions exceeds the minimum value, the internal combustion thermal engine is driven in cut-off mode, i.e. the fuel feeding is cut off and the engine is sustained only by mechanical inertia. Under these conditions, the internal combustion thermal engine absorbs kinetic energy causing a progressive deceleration of the motorcycle, i.e. the driver of the motorcycle feels the so-called "pulse and glide action", which determines a deceleration of the motorcycle (the stronger the deceleration, the lower the current transmission ratio).

When electric traction motorcycles have been suggested, in order to avoid disorienting the drivers accustomed to traditional thermal traction motorcycles, it has been decided to keep the accelerator grip functionality unchanged. Therefore, when the accelerator grip is in the rest position, the generation of the electric driving torque is zeroed and the electric machine is left to rotate freely; however, under these conditions, the pulse and glide action generated by the electric machine is essentially zero, if compared with the pulse and glide action generated by a traditional internal combustion thermal engine. Accordingly, a driver accustomed to the traditional thermal traction motorcycles is disoriented when driving an electric motorcycle due to the essential lack of pulse and glide action when the accelerator grip is in the rest position.

In order to simulate the behaviour of the traditional thermal traction motorcycles, it has been suggested to operate the electric machine as an electric generator (i.e. absorbing mechanical energy to generate electric energy) when the accelerator grip is in the rest position; in this manner, even an electric traction motorcycle has a pulse and glide action which is absolutely similar to a traditional thermal traction motorcycle when the accelerator grip is in the rest position. However, by operating the electric motor as an electric generator when the accelerator grip is in the rest position, the driver of the motorcycle is deprived of the possibility to coast the motorcycle without braking so as to fully exploit the mechanical inertia owned by the motorcycle itself in the most efficient manner.

In other words, in some situations, by operating the electric motor as an electric generator when the accelerator grip is in the rest position, the motorcycle could be subjected to an excessive deceleration with respect to the driver's desires; therefore, under these conditions, the driver should periodically twist the accelerator grip to operate the electric machine as an electric motor (i.e. absorbing electric energy to generate mechanical energy), so as to compensate for the mechanical energy absorbed by the electric machine operated as a generator. This use of the electric machine which comprises cyclically switching between the operation as an electric motor and as an electric generator is relatively poor due to the efficiency of the electric machine; accordingly, in this use, a non-negligible part of the mechanical inertia owned by the motorcycle is dispersed in heat inside the electric machine, and thus wasted.

DISCLOSURE OF INVENTION

It is the object of the present invention to provide a control method and unit of an electric traction motorcycle according to the position of an accelerator grip, which control method and unit are free from the above-described drawbacks and which, specifically, are easy and cost-effective to be implemented.

According to the present invention, a control method and unit of an electric traction motorcycle according to the position of an accelerator grip are provided as claimed in the attached claims.

BRIEF DESCRIPTION OF THE DRAWINGS

The present invention will now be described with reference to the accompanying drawings, which show some non-limitative embodiments thereof, in which.

PREFERRED EMBODIMENTS OF THE INVENTION

Figure 1:
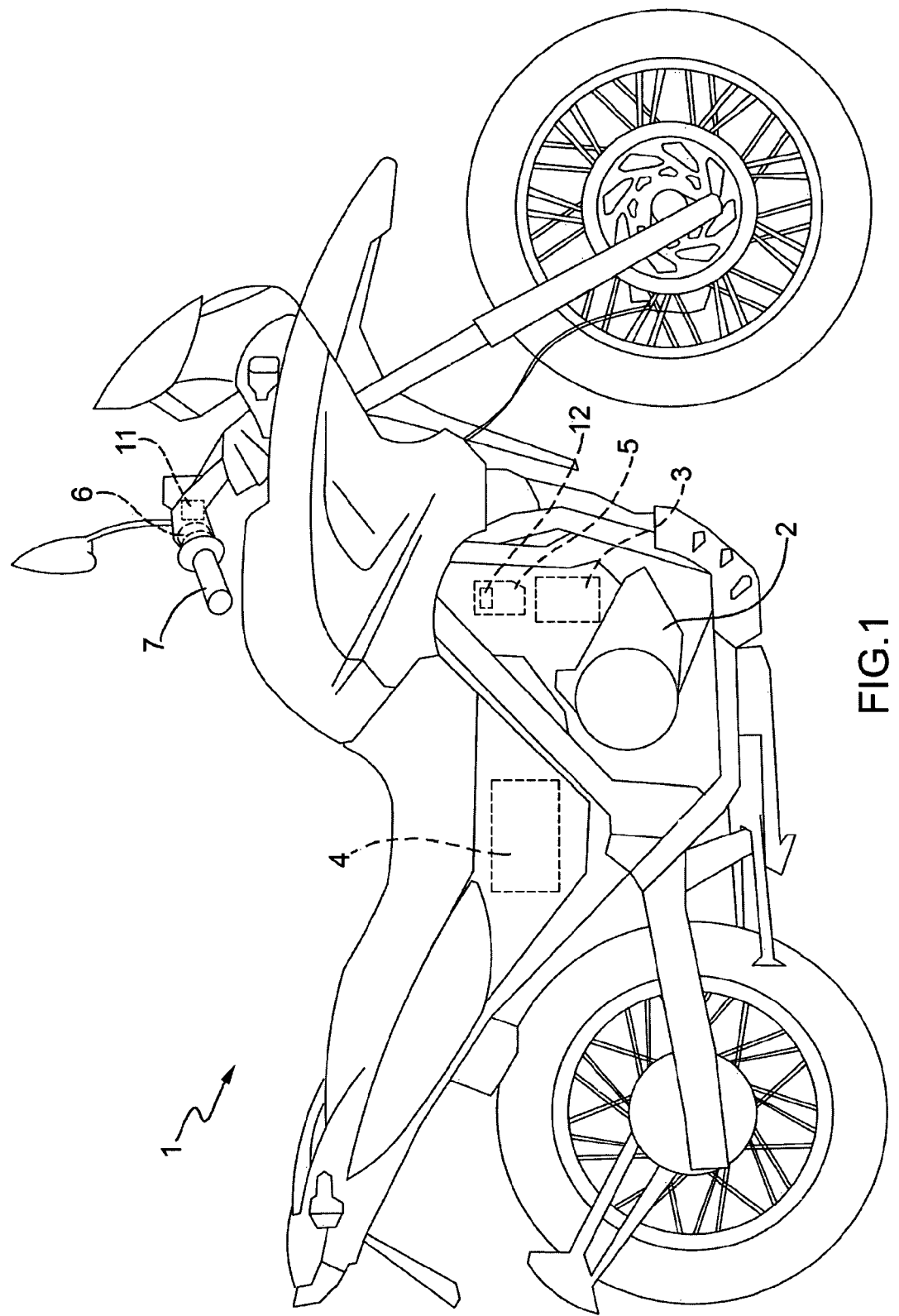
FIG. 1 is a diagrammatic view of an electric traction motorcycle which implements the control method of the present invention.

In FIG. 1, number 1 indicates as a whole an electric traction motorcycle comprising an electric machine 2 having a shaft which is mechanically connected to the rear drive wheel. The electric machine 2 is supplied by an electronic actuating device 3, which is, in turn, electrically connected to an accumulator device 4 consisting of one or more batteries.

The actuating device 3 of the electric machine 2 is controlled by a control unit 5, which is adapted to operate the electric machine 2 as a motor by absorbing electric energy from the accumulator device 4 and generating a mechanical driving torque, which is transmitted to the rear drive wheel, and is adapted to operate the electric machine 2 as a generator, by generating the electric energy supplied to the accumulator device 4 and absorbing a mechanical stalling torque, which is applied to the rear drive wheel.

Figure 2:
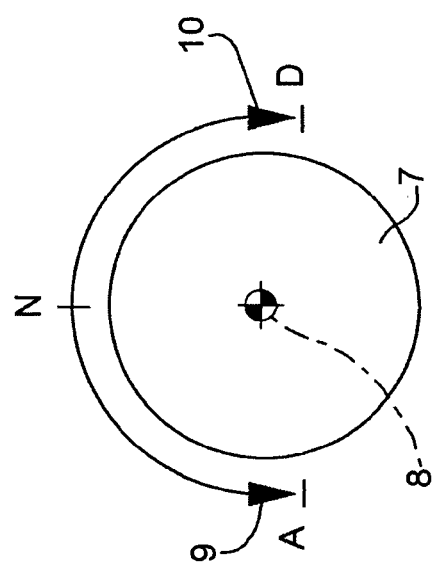
FIG. 2 is a diagrammatic side view of an accelerator grip of the motorcycle in FIG. 1.

The control unit 5 is provided with an angular position a sensor 6 (e.g. of the type described in patent application EP1876339A1) which determines the angular position α of an accelerator grip 7 of pivotally mounted to rotate about a rotation axis 8. As shown in FIG. 2, the accelerator grip 7 is pivotally mounted to rotate in a rotation direction 9 and about the rotation axis 8 from a neutral position N towards a maximum acceleration position A; furthermore, the accelerator grip 7 is pivotally mounted to rotate in a rotation direction 10 opposite to the rotation direction 9 and about a rotation axis 8 from the neutral position N towards a deceleration position D, which is arranged in the direction opposite to the maximum acceleration position A with respect to the neutral position N.

The accelerator grip 7 is either directly or indirectly coupled to an elastic member 11 (typically a spring or a spring system), which tends to keep the accelerator grip 7 in the neutral position N; in other words, in the absence of external actions by the driver of the motorcycle 1, the accelerator grip 7 is ke[[e]]pt in the neutral position N by the bias of the elastic member 11 and, in order to rotate the accelerator grip 7 towards the maximum acceleration position A or towards the deceleration position D, the driver of the motorcycle 1 needs to apply a twisting torque on the accelerator grip 7 itself.

When using the motorcycle 1, a control device 12 of the control unit 5 detects the angular position α of the accelerator grip 7 about the rotation axis 8 and thus drives the electric machine 2 through the actuating device 3 according to the angular position α of the accelerator grip 7.

Figure 3:
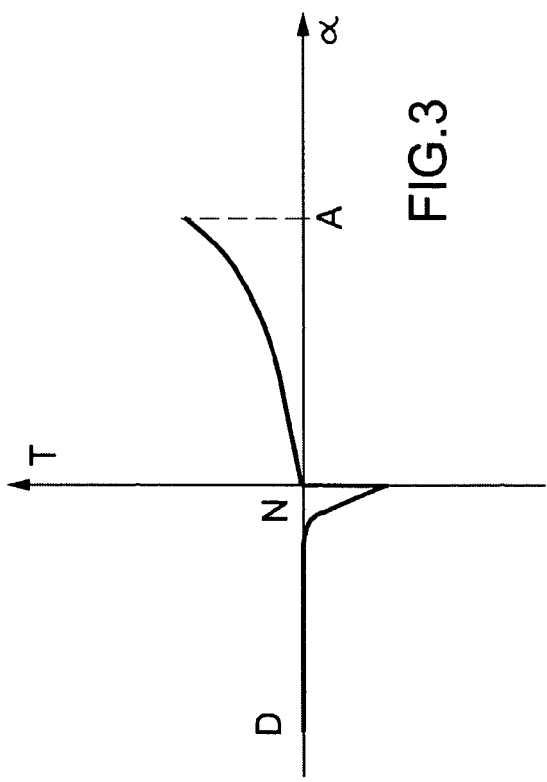
FIG. 3 is a graph which illustrates the value of the driving/stalling torque of an electric machine of the motorcycle in FIG. 1, according to the angular position of an accelerator grip.
Figure 4:
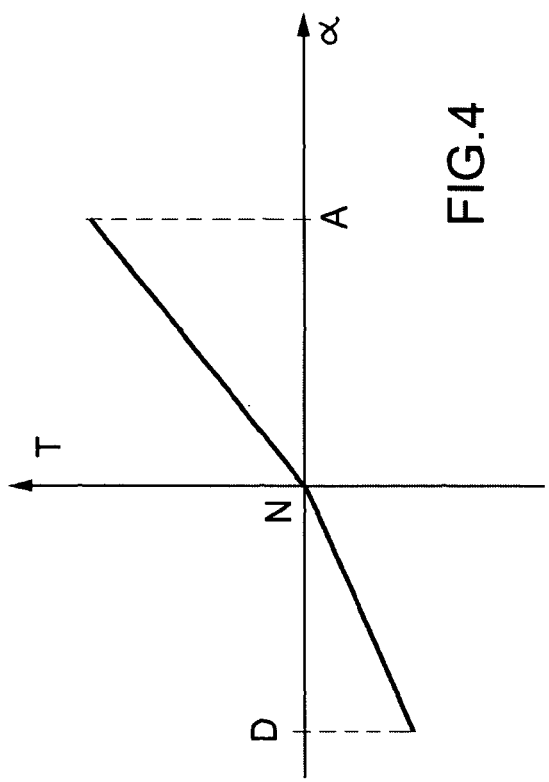
FIG. 4 is a further graph which illustrates the value of the driving/stalling torque of an electric machine of the motorcycle in FIG. 1, according to the angular position of an accelerator grip.

FIGS. 3 and 4 depict two graphs which show the value of the driving/stalling torque T of the electric machine 2 according to the angular position α of the accelerator grip 7. It is worth noting the that curves of the driving/stalling torque T of the electric machine 2 according to the angular position α of the accelerator grip 7 shown in FIGS. 3 and 4 are only illustrative and in a real motorcycle 1 may have a different shape (e.g. a curvilinear shape instead of the rectilinear shape).

As shown in FIGS. 3 and 4, the control device 12 drives the electric machine 2 as a motor for generating a varying driving torque T when the accelerator grip 7 is between the neutral position N and the maximum acceleration position A; in this case, the value of the driving torque T varies according to the angular position α of the accelerator grip 7 and progressively increases with the increase of the angular position α of the accelerator grip 7.

According to the embodiment shown in FIG. 3, the control device 12 drives the electric machine 2 as a generator to absorb a mechanical torque T (i.e. performs a regenerative braking) when the accelerator grip 7 is in the neutral position N, and the control device 12 switches off the electric machine 2 when the accelerator grip 7 is in the deceleration position D; furthermore, the control device 12 progressively reduces (i.e. until the electric machine 2 is switched off) the mechanical torque T absorbed by the electric machine 2 operating as a generator to a zero value, as the accelerator grip 7 rotates from the neutral position N to the deceleration position D. In other words, when the accelerator grip 7 is in the neutral position N, the control device 12 drives the electric machine 2 as a generator to absorb a mechanical torque T (i.e. performs a regenerative braking) so as to simulate the pulse and glide action of a traditional thermal traction motorcycle; therefore, the value of the mechanical torque T absorbed by the electric machine 2 operating as a generator when the accelerator grip 7 is in the neutral position N is set close to (i.e. more or less similar by rounding up or down) the value of the mechanical torque T required to sustain an internal combustion thermal engine of the type of those which may be installed in the motorcycle 1 in the cut-off mode. Furthermore, the control device 12 switches off the electric machine 2 when the accelerator grip 7 is either in the deceleration position D or close to the deceleration position D so that the electric machine 2 does not generate nor absorb any mechanical torque and thus behaves as an inert rotating mass ("free-wheeling" condition); such an operating mode is used by the driver of the motorcycle 1 for more effectively exploiting the mechanical inertia owned by the motorcycle 1.

According to the embodiment shown in FIG. 4, the control device 12 switches off the electric machine 2 when the accelerator grip 7 is in the neutral position N and the control device 12 drives the electric machine 2 as a generator for absorbing a mechanical torque T (i.e. performs a regenerative braking) when the accelerator grip 7 is between the neutral position N and the deceleration position D. In other words, the control device 12 switches off the electric machine 2 when the accelerator grip 7 is in the neutral position N so that the electric machine 2 does not generate nor absorb any mechanical torque and thus behaves as an inert rotating mass ("free-wheeling" condition); such an operating mode is used by the driver of the motorcycle 1 for more effectively exploiting the mechanical inertia owned by the motorcycle 1.

According to a possible embodiment (not shown), the control device 12 drives the electric machine 2 as a generator to absorb a constant mechanical torque T when the accelerator grip 7 is between the neutral position N and the deceleration position D; in other words, when the accelerator grip 7 is between the neutral position N and the deceleration position D, the electric machine 2 performs a regenerative braking at a constant braking torque.

According to a different embodiment shown in FIG. 4, the control device 12 drives the electric machine 2 as a generator to absorb a varying mechanical torque T when the accelerator grip 7 is between the neutral position N and the deceleration position D; in this case, the control device 12 sets the value of the mechanical torque T absorbed by the electric machine 2 operating as a generator according to the angular position α of the accelerator grip 7 when the accelerator grip 7 is between the neutral position N and the deceleration position D (typically, higher the absorbed mechanical power, greater the angular position α of the accelerator grip 7). In other words, when the accelerator grip 7 is between the neutral position N and the deceleration position D, the electric machine performs a regenerative braking at a varying braking torque which increases with the increase of the angular position α of the accelerator grip 7 (i.e. when the angular position α of the accelerator grip 7 approaches the deceleration position D).

According to a possible embodiment, when the motorcycle 1 stands and the accelerator grip 7 is between the neutral position N and the deceleration position D, the control device 12 drives the electric machine 2 as a static electromagnetic brake; in other words, simply by twisting the accelerator grip 7, the driver applies the brakes to the motorcycle 1 using the electric machine 2 as a static electromagnet brake. Such an operating mode may be advantageous (i.e. simple and intuitive to be used) in case of hill start (uphill or downhill).

According to a preferred embodiment, the control device 12 determines the charge level of the accumulator device 4 of the motorcycle 1 and allows the electric machine 2 to be operated as a generator only if the charge level of the electric accumulator device 4 is lower than a threshold value (i.e. if the accumulator device 4 is not fully charged and thus allows to store further electric energy). The situation of full charge of the electric accumulator device 4 (i.e. the situation of deactivation of the regenerative braking) could be indicated to the driver of the motorcycle 1 by means of an appropriate visual indication provided on a dashboard of the motorcycle 1.

In the above-described embodiment, reference is made to a motorcycle 1 with electric traction only; obviously, the above-described control mode may also be applied to a hybrid traction motorcycle 1 (i.e. both thermal and electric) when the electric traction is used.

The above-described embodiment refers to a motorcycle 1; obviously, the above-described control mode may be applied to any electric traction vehicles provided with an accelerator grip (e.g. a four-wheel quad bike, or a tricycle, or a three-wheel sidecar).

The above-described control method has many advantages because it is cost-effective and compact to be implemented even in an existing motorcycle, it is very simple and intuitive to be learnt and used, even for a driver accustomed to drive a traditional thermal traction motorcycle, and allows the driver to drive the motorcycle either with a regenerative braking or without a regenerative braking, with the electric machine off behaving as an inert rotating mass ("free-wheeling" condition) to exploit the mechanical inertia owned by the motorcycle 1 in a more effective manner.

The invention claimed is:

1. A control method of an electric traction motorcycle comprising the steps of:
    mounting an accelerator grip so that the accelerator grip will rotate in a first rotation direction and about a rotation axis from a neutral position (N) towards a maximum acceleration position (A), and in a second rotation direction, opposite to the first rotation direction, and about the rotation axis from the neutral position (N) towards a deceleration position (D), which is arranged in the direction opposite to the maximum acceleration position (A) with respect to the neutral position (N);
    arranging an elastic member which tends to keep the accelerator grip in the neutral position (N);
    detecting the angular position ($\alpha$) of the accelerator grip about the rotation axis during operation of the motorcycle and producing signals corresponding thereto;
    driving the electric machine as a motor for generating a varying driving torque (T) when the accelerator grip is between a neutral position (N) and the maximum acceleration position (A) and the value of the driving torque (T) varies according to the angular position ($\alpha$) of the accelerator grip;
    driving the electric machine as a generator for absorbing a mechanical torque (T) that brakes the motorcycle when the accelerator grip is in the neutral position (N); and
    switching off the electric machine to eliminate the braking of the motorcycle when the accelerator grip is in the deceleration position.

2. The control method according to claim 1 comprising the further step of setting the value of the mechanical torque (T) absorbed by the electric machine operating as a generator when the accelerator grip is in the neutral position (N) close to the value of the mechanical torque (T) required for sustaining an internal combustion thermal engine of the type of those which may be installed in the motorcycle in the cut-off mode.

3. The control method according to claim 1 comprising the further step of progressively reducing the mechanical torque (T) absorbed by the electric machine operating as a generator to a zero value, as the accelerator grip rotates from the neutral position (N) to the deceleration position (D).

4. The control method according to claim 1 comprising the further steps during use of:
    determining the charge level of an electric accumulator device of the motorcycle and comparing the determined charge level with a threshold value; and
    allowing the operation of the electric machine as a generator only if the determined charge level of the electric accumulator device is lower than the threshold value.

5. A control unit for an electric traction motorcycle comprising:
    an accelerator grip pivotally mounted to rotate in a first rotation direction about a rotation axis from a neutral position (N) towards a maximum acceleration position (A), and in a second rotation direction opposite to the first rotation direction and about the rotation axis away from the neutral position (N) towards a deceleration position (D) arranged in a direction opposite to the maximum acceleration position (A);
    an elastic member to bias the accelerator grip toward the neutral position (N);
    at least one position sensor to detect the angular position ($\alpha$) of the accelerator grip about the rotation axis; and
    a control device which drives an electric machine as a motor for generating a varying driving torque (T) when the accelerator grip is between the neutral position (N) and the maximum acceleration position (A) and the value of the driving torque (T) varies according to the angular position ($\alpha$) of the accelerator grip
    wherein the control device drives the electric machine as a generator for absorbing a mechanical torque (T) that brakes the motorcycle when the accelerator grip is in the neutral position (N); and
    wherein the control device switches off the electric machine to eliminate the braking of the motorcycle when the accelerator grip is in the deceleration position (D).

6. The control device according to claim 5, wherein the value of the mechanical torque (T) absorbed by the electric machine operating as a generator when the accelerator grip is in the neutral position (N) is set close to the value of the mechanical torque (T) required for sustaining an internal combustion thermal engine of the type of those which may be installed in the motorcycle in the cut-off mode.

7. The control unit according to claim 5, wherein the control device progressively reduces the mechanical torque (T) absorbed by the electric machine operating as a generator to a zero value, as the accelerator grip rotates from the neutral position (N) to the deceleration position (D).

8. A control unit for an electric traction motorcycle comprising:
    an accelerator grip pivotally mounted to rotate in a first rotation direction about a rotation axis from a neutral position (N) towards a maximum acceleration position (A), and in a second rotation direction opposite to the first rotation direction and about the rotation axis away from the neutral position (N) towards a deceleration position (D)
    a biasing member to move the accelerator grip toward the neutral position (N);
    at least one position sensor to detect the angular position ($\alpha$) of the accelerator grip about the rotation axis; and a control device which drives an electric machine as a motor for generating a varying driving torque (T) when the accelerator grip is between the neutral position (N) and the maximum acceleration position (A), which drives the electric machine as a generator for absorbing a mechanical torque (T) that brakes the motorcycle when the accelerator grip is in the neutral position (N), and which switches off the electric machine to eliminate the braking of the motorcycle when the accelerator grip is in a selected position, and wherein the value of the mechanical torque (T) absorbed by the electric machine operating as a generator when the accelerator grip is in the neutral position (N) is set close to the value of the mechanical torque (T) required for sustaining an internal combustion thermal engine of the type of those which may be installed in the motorcycle in a cut-off mode.

* * * * *